United States Patent [19]

Brown et al.

[11] 4,364,422

[45] Dec. 21, 1982

[54] METHOD OF PRODUCING A NICKEL ELECTRODE

[75] Inventors: David J. Brown; Michael Reid, both of West Midlands, England

[73] Assignee: Lucas Industries Limited, Birmingham, England

[21] Appl. No.: 191,757

[22] Filed: Sep. 29, 1980

[30] Foreign Application Priority Data

Oct. 3, 1979 [GB] United Kingdom ................ 7934242

[51] Int. Cl.³ ...................... H01M 4/29; H01M 4/30; H01M 4/32
[52] U.S. Cl. .................................... 141/1.1; 29/623.5; 427/123; 427/215; 252/425.3
[58] Field of Search ................... 29/623.5, 2; 429/223, 429/217; 252/425.3; 427/123, 215; 141/1.1

[56] References Cited

U.S. PATENT DOCUMENTS

| 3,066,178 | 11/1962 | Winkler | 136/24 |
| 3,108,910 | 10/1963 | Herold | 429/223 |
| 3,657,013 | 4/1972 | Melin | 429/223 |
| 3,725,129 | 4/1973 | Ruzzo, Jr. | 141/1.1 |
| 3,752,706 | 8/1973 | Melin | 429/223 |
| 3,928,068 | 12/1975 | Jackovitz et al. | 141/1.1 |
| 4,029,132 | 6/1977 | Jackovitz et al. | 429/223 |
| 4,049,027 | 9/1977 | Seiger | 429/223 |
| 4,063,576 | 12/1977 | Gunther | 141/1.1 |
| 4,130,696 | 12/1978 | Gunther | 429/223 |

FOREIGN PATENT DOCUMENTS

| 1273645 | 7/1968 | Fed. Rep. of Germany | 429/223 |
| 763452 | 12/1956 | United Kingdom . | |
| 777417 | 6/1957 | United Kingdom . | |
| 1514204 | 6/1978 | United Kingdom . | |
| 1536205 | 12/1978 | United Kingdom . | |

OTHER PUBLICATIONS

Iwaki, et al., "Nickel Electrode for an Alkaline Battery," Chem. Abs., 88:155729k, p. 189 (May 29, 1978).
Yamazaki, et al., "Nickel Electrode for Alkaline Storage Battery" Chem. Abs., 89:8914; p. 158 (Jul. 10, 1978).
Kuzmin, Yu, et al., Chem. Abs., 80:9712t, p. 455 (Jan. 14, 1974).

Primary Examiner—Daniel C. Crane
Attorney, Agent, or Firm—Holman & Stern

[57] ABSTRACT

A method of producing a nickel electrode comprising a current collector and active material pressed into physical and electrical contact with the current collector. The active material comprises nickel hydroxide, an organic binder, a conductive diluent and a cobalt compound, the cobalt compound having been precipitated from a cobalt-containing solution in contact with the already-formed nickel hydroxide.

13 Claims, 2 Drawing Figures

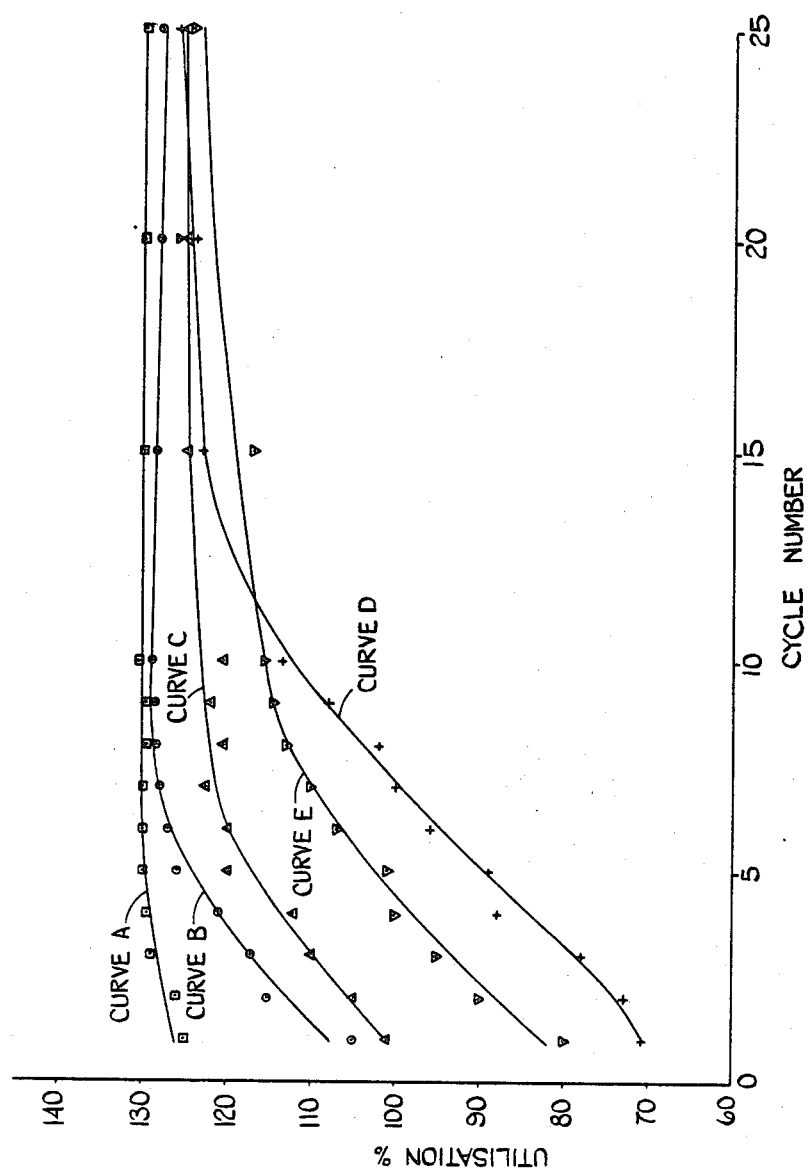

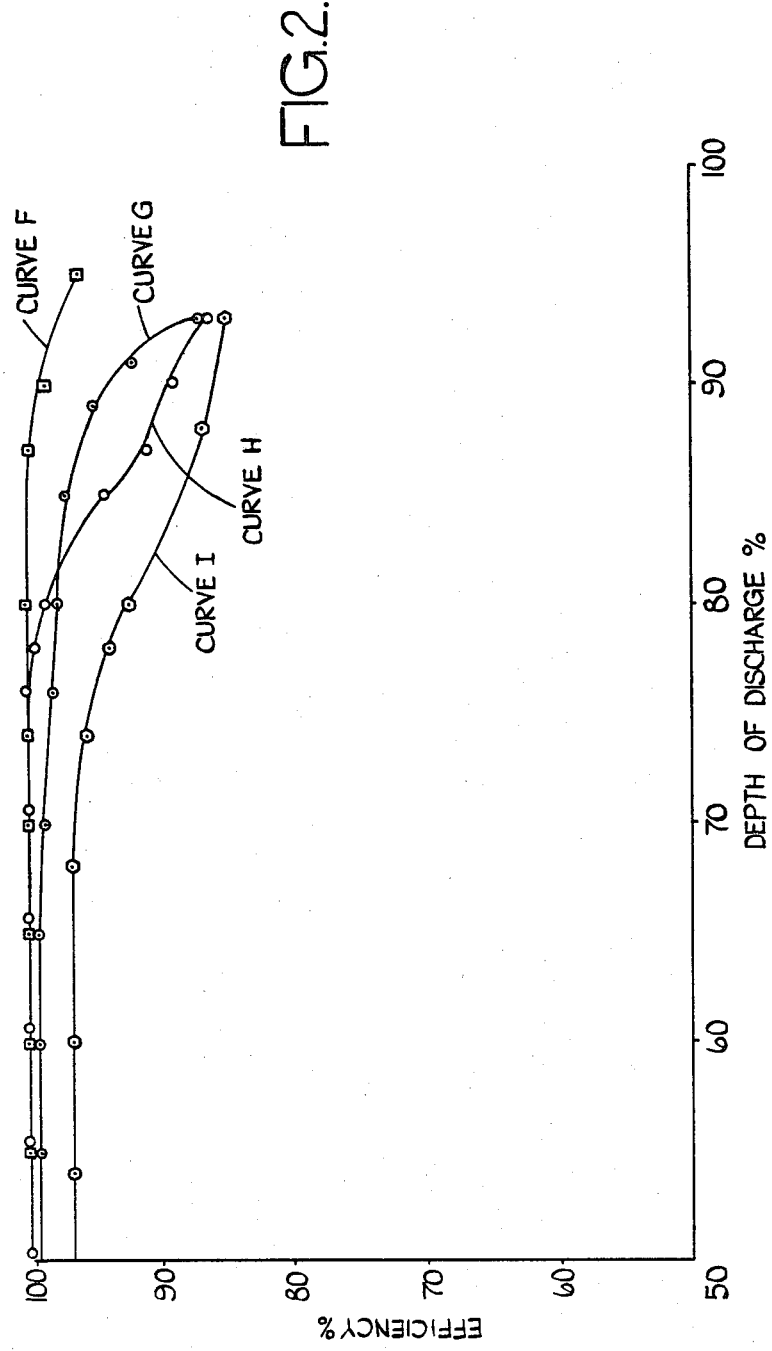

METHOD OF PRODUCING A NICKEL ELECTRODE

BACKGROUND OF THE INVENTION

This invention relates to a method of making a nickel electrode particularly, but not exclusively, for use in secondary electrochemical cells (including nickel/cadmium, nickel/hydrogen, nickel/iron and nickel/zinc cells).

Existing nickel electrodes can in general be divided into three types:
pocket electrodes,
sintered electrodes, and
pressed electrodes.

In a pocket electrode, the active material of the electrode is contained in a thick, perforated pocket formed of nickel-plated steel. The resulting electrode is highly stable and exhibits a very long cycle life, typically of the order of thousands of cycles. However, this type of electrode suffers from the problem of being relatively heavy and hence its gravimetric energy density tends to be poor, typically varying between 0.06 and 0.09 Ah/gm of active material. In an attempt to overcome the problems experienced with pocket electrodes, sintered nickel electrodes were developed in which nickel powder is sintered at a temperature in the order of 900°-1000° C. and then is impregnated, either by a chemical or an electrochemical process, with the required active material. In view of the advantageous current carrying capacities of the sintered substrate, sintered nickel electrodes exhibit excellent power performance and improved gravimentric and volumetric energy density as compared with pocket nickel electrodes. Typically, the gravimetric energy density of a sintered electrode is of the order of 0.11-0.12 Ah/gm of active material, whereas the volumetric energy density is of the order of 0.35-0.4 Ah/c.c. of active material. Sintered electrodes also exhibit similar cycle lives to pocket electrodes, but suffer from the disadvantage that the production and material costs are high. Pressed electrodes are produced by pressing the active material into contact with a current collector and have the advantage that they are both lighter in weight than pocket electrodes and cheaper to produce than sintered electrodes. However, up to now, pressed electrodes have had a relatively short cycle life, typically of the order of several hundred cycles, so that they have not as yet proved viable for large scale production.

In each of the above types of nickel electrode, the active material normally comprises nickel hydroxide as the main constituent, which undergoes the following reversible reaction during discharge and subsequent charging:

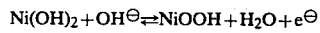
$$Ni(OH)_2 + OH^{\ominus} \rightleftharpoons NiOOH + H_2O + e^{\ominus}$$

The active material may also comprise a binder, such as polytetrafluoroethylene, and a conductive diluent such as graphite or nickel powder. Moreover, in order to improve the performance of the electrode, it is normal to incorporate a cobalt compound in the active material. Typically the cobalt compound is in the form of cobalt hydroxide and is present in an amount such that the active material contains between 5 and 8% of cobalt hydroxide by weight of the total weight of nickel hydroxide and cobalt hydroxide. Using this level of cobalt addition, it is readily possible to obtain sintered electrodes having a percentage utilization of the nickel hydroxide as high as 120-130%, although with pressed electrodes, the percentage utilization is normally only 70-100%. However, the use of such high cobalt additions in pressed electrodes suffers from the problem that it tends to cause swelling of the electrode so that, unless further additives (for example, cadmium hydroxide) are introduced into the active material, the service life of the electrode is reduced. In addition, with pressed and sintered nickel electrodes containing substantial quantities of cobalt hydroxide, it is found that the electrodes only slowly develop their capacity during charging and discharging cycles so that typically the full capacity is not reached until after 20-30 cycles.

In order to incorporate a cobalt compound in the active material of a nickel electrode, a number of methods have to date been proposed. The most commonly used is co-precipitation in which sodium or potassium hydroxide is added to a common solution containing cobalt and nickel ions so as to co-precipitate cobalt hydroxide and nickel hydroxide. The mixed hydroxide precipitate is then used as the active material of the electrode. An alternative method is to produce the cobalt and nickel hydroxide separately and then to physically blend them during production of the active material. In addition, it is known in the case of sintered and pocket electrodes to introduce the cobalt compound into the active material by contacting already formed nickel hydroxide with a solution of a cobalt salt and then precipitating the cobalt compound from this solution by the addition of an alkali metal hydroxide or carbonate to the solution. However, no relative advantages over the co-precipitation route have been gained and to date this method has not been employed in the production of pressed electrodes.

Following research which has now been conducted into alleviating the problems experienced with conventional nickel electrodes, it has been found that a pressed nickel electrode having improved performance can be obtained by ensuring that the active material contains a cobalt compound produced by precipitation from a cobalt containing solution in contact with already formed nickel hydroxide. Advantageous results are obtained with cobalt additions equal to or less than 3% of the total weight of the nickel hydroxide and cobalt compound and hence, in view of the high cost of cobalt, in practice the upper limit of the cobalt addition will be 3% or less of the total weight of the cobalt compound and nickel hydroxide. The resultant electrode is found to have an improved gravimetric energy density as high as 0.2 Ah/g, an excellent high rate performance, efficiency and cycle life, and to reach its full capacity after a small number of discharging and charging cycles. The percentage utilization of the nickel hydroxide is found to be as high as 130%.

BRIEF SUMMARY OF THE INVENTION

Accordingly, the invention resides in the method of making a nickel electrode comprising a current collector and active material pressed into physical and electrical contact with the current collector, the active material comprising nickel hydroxide, an organic binder, a conductive diluent and a cobalt compound, the cobalt compound having been precipitated from a cobalt-containing solution in contact with the already-formed nickel hydroxide.

It is to be appreciated that the precipitation of the cobalt compound can be effected before or after the nickel hydroxide is mixed with the other constituents of the active material. In the latter case, the precipitation of the cobalt compound can be effected before or after the active material is pressed into contact with the current collector. The cobalt compound may be cobalt hydroxide precipitated by the addition of an alkali metal hydroxide to the cobalt-containing solution, or may be a basic cobalt carbonate precipitated by addition of an alkali metal carbonate to the solution.

Preferably, the weight of the cobalt present in the active material is less than or equal to 3% of the total weight of the nickel hydroxide and the cobalt compound.

Preferably, the weight of the cobalt present is between 1 and 2% of the total weight of nickel hydroxide and the cobalt compound.

Conveniently, the organic binder is polytetrafluoroethylene. The preferred amount of polytetrafluoroethylene is 1 wt % of the active material since increasing the polytetrafluoroethylene content above 1% to 5% by weight results in no significant difference in the electrochemical performance of the electrode, but increases the cost of the electrode and reduces the amount of nickel hydroxide present for a given weight of active material. In addition, although satisfactory electrodes can be produced with a polytetrafluoroethylene content below 1% by weight of the active material, there is a gradual decrease in the mechanical strength of the electrode as the polytetrfluoroethylene content is reduced until at values below 0.4% by weight the electrode becomes too weak for handling in production.

Conveniently, the conductive diluent is graphite and preferably the graphite comprises 24 wt % of the active material.

Preferably, the active material consists of 75 wt % of a combination of nickel hydroxide and the cobalt compound, 24 wt % of graphite, and 1 wt % of polytetrafluoroethylene.

Most preferably, the combination of nickel hydroxide and the cobalt compound contains 58 wt % of nickel and 1 wt % of cobalt.

The method of producing a nickel electrode comprising the steps of:
(a) contacting nickel hydroxide powder with a solution containing cobalt ions and precipitating a cobalt compound from said solution onto the nickel hydroxide powder,
(b) before or after step (a), mixing the nickel hydroxide powder with a powdered conductive diluent and a powdered binder and pressing the resultant mixture into physical and electrical contact with a current collector.

BRIEF DESCRIPTION OF THE DRAWINGS

In the accompanying drawings,

FIG. 1 is a graph in which percentage utilisation is plotted against the number of charging and discharging cycles for three pressed nickel electrodes having varying cobalt and nickel concentrations obtained by a method according to one example of the invention (indicated by the curves A, B and C respectively on the graph) and for two conventional pressed nickel electrodes (indicated by the curves D and E) and FIG. 2 is a graph in which percentage efficiency is plotted against percentage depth of discharge for two further pressed nickel electrodes obtained in accordance with said one example of the invention (indicated by the curves F and G) and for two further conventional pressed nickel electrodes (indicated by the curves H and I).

DETAILED DESCRIPTION OF THE PREFERRED EMBODIMENTS

In the method according to said one example of the invention, nickel hydroxide powder was first produced by adding a 0.92 M aqueous nickel sulphate solution to a 11.6 M aqueous potassium hydroxide solution, with the latter being rapidly stirred. The addition was effected at room temperature and, as the nickel sulphate was introduced into the potassium hydroxide, a highly amorphous precipitate of a nickel hydroxide was produced. The precipitate was filtered in a filter press to remove excess liquid and was then dried in an air oven at 100°–110° C. for twenty-four hours. The dried material was then ground so as to pass through a 200 mesh screen and was subsequently washed with hot distilled water to remove the impurities, particularly sulphate ions, before being dried again at 100°–110° C. The final material was a hydrated form of nickel hydroxide having a crystalline size of less than 30 Å as measured along the c-axis, and which contained less than 1% by weight of sulphate impurity Three samples of the nickel hydroxide were then allowed to soak in excess of varying concentrations of aqueous cobalt sulphate solution for at least four hours, with the slurry being continuously stirred. The excess cobalt sulphate was then filtered off and the damp material wetted with a 1 M aqueous sodium carbonate solution to precipitate the cobalt containing compound on the nickel hydroxide. The resultant material was then washed with hot distilled water and dried at 100°–110° C. The analysis for the three different samples (A-C in FIG. 1) is given in Table 1 in which the percentage of nickel and cobalt are the amounts of each metal present based on the total weight of the nickel hydroxide and cobalt hydroxide sample.

Each sample was then ground to pass through a 200 mesh screen and 75 parts by weight of the ground mixture were then dry blended with 24 parts by weight of graphite flake until a uniform grey mix was obtained. The graphite flake conveniently had a 2.5 micron particle size and was supplied by Rocol Ltd. Distilled water was then added to each grey mix to form a smooth paste, whereafter 1 part by weight of polytetrafluoroethylene as an aqueous dispersion (60% solids) was added to the paste to give a slurry. Each slurry was then dried at about 100° C. to produce a dry cake to which a propylene glycol lubricant was added to allow the slurry to be kneaded into a doughlike mixture of graphite and the nickel/cobalt material bound together by fibres of polytetrafluoroethylene. The resultant dough was then rolled to give an electrode strip of the required thickness, whereafter each strip was dried in an oven to remove the propylene glycol and cut to the required size. Two pieces of each cut strip, each measuring 4.4 cm. square were then pressed at 5 t.s.i., onto opposite sides respectively of a woven nickel mesh current collector to provide a respective pressed nickel electrode having an electrical conductivity of 0.5 ohm cm, with theoretical capacity (calculated by assuming a 1 electron change in the overall electrochemical reaction occurring in the nickel electrode) as shown in Table 1.

TABLE 1

| Sample | Concentration of cobalt sulphate solution | % Ni | % Co | Theoretical capacity |
|---|---|---|---|---|
| A | 1M | 57.88 | 2.41 | 1.29 |
| B | 0.03M | 58.15 | 0.68 | 1.24 |
| C | 0.01M | 60.72 | 0.28 | 1.36 |

Each of the resultant electrodes was then wrapped in a single layer of 0.013 cm thick polyamide felt before being assembled between two sintered-type cadmium electrodes. The resultant cells were then charged at the 3 hour rate for 4.5 hours in an aqueous electrolyte containing 30 wt % of potassium hydroxide and 5 gm/liter of lithium hydroxide, the nickel electrode potential being monitored with a Hg/HgO reference electrode immersed in the electrolyte. After charging, each cell was discharged at the 5 hour rate to a cut-off voltage of zero volts with respect to the reference electrode. This charging and discharging cycle was repeated and the percentage utilisation of the active material of each electrode was monitored over 25 cycles. The results of these tests are shown in curves A, B and C in FIG. 1. The tests were then repeated under identical conditions with two similar pressed nickel electrodes, in which the active material comprised co-precipitated nickel and cobalt hydroxides. The percentage of nickel and cobalt metal based on the total weight of nickel hydroxide and cobalt hydroxide in each of the comparison electrodes are given in Table 2, which also indicates the theoretical capacities of the comparison electrodes.

TABLE 2

| Sample | % Ni | % Co | Theoretical Capacity/Ah |
|---|---|---|---|
| D | 56.30 | 3.08 | 1.71 |
| E | 57.10 | 0.57 | 1.46 |

The results of these comparative tests are shown in curves D and E (FIG. 1). From curves A to C, it will be seen that the electrodes produced in accordance with said one example of the invention exhibited higher theoretical capacities, and reached their maximum capacities more rapidly, then the conventional pressed nickel electrodes. The electrodes produced in accordance with the invention also exhibited excellent cycle life (up to 1000 cycles at 80% depth of discharge with only 10–15% fall off in capacity) and improved efficiency as compared with conventional pressed nickel electrodes.

To demonstrate the improvement in efficiency, the method of said one example was repeated to produce two further pressed nickel electrodes having the nickel and cobalt contents given in Table 3 below. The resultant electrodes were then made up into cells in the same way as described above, whereafter the cells were charged at the 2 hour rate to a predetermined value and subsequently discharged at the same rate to zero volts, with the nickel electrode potential being measured against a Hg/HgO reference electrode. The results of these tests are shown in curves F and G in FIG. 2, whereas the result of tests performed on two conventional electrodes (whose nickel and cobalt contents are also given in Table 3) are indicated by the curves H and I. As before, the nickel and cobalt contents of Table 3 are the weight percentages of each metal based on the total weight of nickel hydroxide and cobalt hydroxide in the associated electrode.

TABLE 3

| Sample | % Ni | % Co |
|---|---|---|
| F | 57.9 | 2.98 |
| G | 59.0 | 1.1 |
| H | 52.0 | 4.0 |
| I | 57.8 | 0.7 |

From a comparison of the curves F and G with the curves H and I in FIG. 2, it will be seen that the electrodes produced according to said one example of the invention exhibited improved efficiency at equivalent cobalt levels.

It will be noted that in the electrodes produced in accordance with said one example of the invention, the lowest cobalt concentration was in sample C which contained 0.28% by weight of cobalt metal based on the total weight of nickel hydroxide and cobalt hydroxide. Further experimentation has, however, shown that the improvement in electrochemical performance over electrodes produced by the co-precipitation route is maintained when the method of said one example is repeated with lower cobalt concentrations than 0.28%. However, at such low levels of cobalt, the advantages gained by the presence of cobalt progressively reduce so that, below 0.1% by weight, little difference could be observed between electrodes with and without cobalt present.

The method of said one example was also repeated with varying percentages of graphite present in the active material and, whereas samples A and B containing 24% graphite gave a percentage utilisation rising to 128%, electrodes in which the active material contained 19% and 14% by weight of graphite gave maximum percentage utilisations of 118% and 100% respectively. It will, however, be understood that such electrodes, and in particular that containing 19% by weight of graphite, still constitute satisfactory electrodes. Increasing the graphite content above 24% by weight of the active material was found to lead to no significant improvement in the electrochemical properties of the electrode. The preferred amount of graphite is therefore 24% by weight of the total weight of active material.

In each of the electrodes produced according to said one example of the invention, the particle size of the graphite employed has been 2.5 microns and, although satisfactory electrodes can be produced over a wide range of graphite particle sizes, the 2.5 micron size is preferred. Thus, for example, if the graphite particle size is increased to 15 microns, it is found that a less homogeneous mixed paste is produced and the electrical conductivity of the dried electrode strip after pressing is increased to about 2 ohm cm. If, on the other hand, the graphite particle size is reduced to 1 to 1.5 microns, it is found the resultant electrode is more prone to oxidation.

We claim:

1. A method of producing a pressed nickel electrode comprising the sequential steps of:
   (a) contacting nickel hydroxide powder with a solution containing cobalt ions and precipitating a cobalt compound from said solution onto the nickel hydroxide powder,
   (b) mixing the nickel hydroxide powder containing said precipitated cobalt compound with a powdered conductive diluent and a powdered binder to form a resultant mixture, and (c) pressing the resultant mixture into physical and electrical contact with a current collector.

2. A method of producing a pressed nickel electrode comprising the sequential steps of:
(a) mixing nicle hydroxide powder with a powdered conductive diluent and a powdered binder to form a resultant mixture,
(b) pressing the resultant mixture into physical and electrical contact with a current collector, and
(c) contacting said pressed resultant mixture with a solution containing cobalt ions and precipitating a cobalt compound from said solution onto said pressed resultant mixture.

3. A method of producing a pressed nickel electrode comprising the sequential steps of:
(a) mixing nickel hydroxide powder with a powdered conductive diluent and a powdered binder to form a resultant mixture,
(b) contacting said resultant mixture with a solution containing cobalt ions and precipitating a cobalt compound from said solution onto said resultant mixture, and
(c) pressing said resultant mixture of step (b) into physical and electrical contact with a current collector.

4. A method as claimed in any one of claims 1, 2 or 3, wherein weight of the cobalt metal present in the cobalt containing resultant mixture or the cobalt containing pressed resultant mixture is less than or equal to 3% of the total weight of the nickel hydroxide and the cobalt compound.

5. A method as claimed in any one of claims 1, 2 or 3, wherein weight of the cobalt metal present in the cobalt containing resultant mixture or the cobalt containing pressed resultant mixture is between 1 and 2% of the total weight of nickel hydroxide and the cobalt compound.

6. A method as claimed in any one of claims 1, 2 or 3, wherein the binder is an organic binder comprising polytetrafluoroethylene.

7. A method as claimed in claim 6, wherein the polytetrafluoroethylene comprises 1 wt % of the cobalt containing resultant mixture or the cobalt containing pressed resultant mixture.

8. A method as claimed in claim 1, wherein the conductive diluent is graphite.

9. A method as claimed in claim 8, wherein the graphite comprises 24 wt % of the cobalt containing resultant mixture or the cobalt containing pressed resultant mixture.

10. A method as claimed in any one of claims 1, 2 or 3, wherein the cobalt containing resultant mixture of the cobalt containing pressed resultant mixture consists of 75 wt % of a conbination of nickel hydroxide and the cobalt compound, 24 wt % of graphite, and 1 wt % of polytetrafluoroethylene.

11. A method as claimed in claim 10, wherein the combination of nickel hydroxide and the cobalt compound contains 58 wt % of nickel and 1 wt % of cobalt.

12. A method as claimed in any one of claims 1, 2 or 3, wherein the cobalt compound is precipitated from said solution by adding thereto ions selected from the group consisting of hydroxyl ions and carbonate ions.

13. A method as claimed in claim 1, further comprising the step of removing excess of said solution containing cobalt ions from said nickel hydroxide powder prior to precipitation of said cobalt compound.

* * * * *